ately to reach

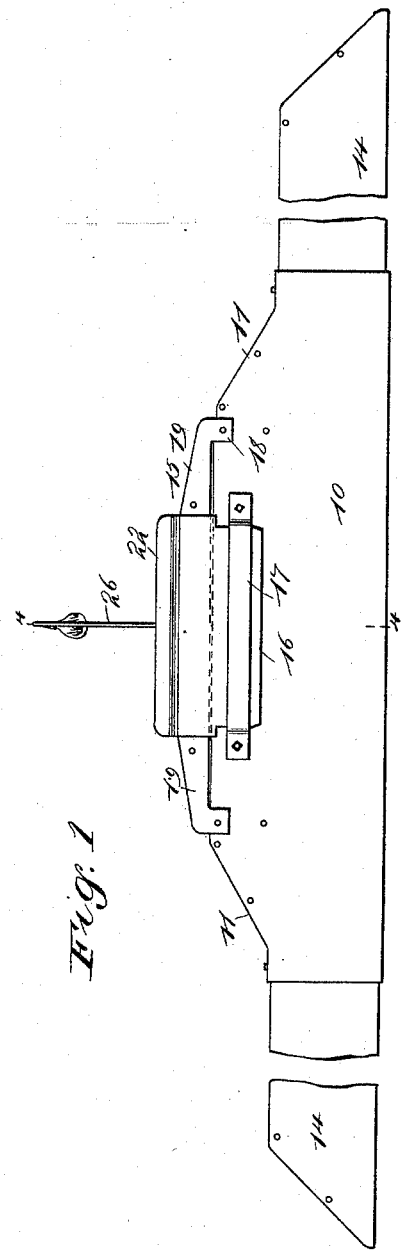

UNITED STATES PATENT OFFICE.

JOHN ROSS, OF HALIFAX, CANADA.

ANIMAL-TRAP.

SPECIFICATION forming part of Letters Patent No. 526,582, dated September 25, 1894.

Application filed October 21, 1893. Serial No. 488,767. (No model.)

*To all whom it may concern:*

Be it known that I, JOHN ROSS, of Halifax, Nova Scotia, Canada, have invented a new and Improved Animal-Trap, of which the following is a full, clear, and exact description.

My invention relates to improvements in animal traps; and the object of my invention is to produce a simple form of trap which is adapted to catch small animals alive, but which may be adapted to catch larger animals, which is constructed in such a manner that an animal may readily operate it, which has means for resetting itself after an animal has been caught, and the construction of which is such that the animals caught may be conveniently removed.

To these ends my invention consists of certain features of construction and combinations of parts, as will be hereinafter described and claimed.

Reference is to be had to the accompanying drawings, forming a part of this specification, in which similar figures of reference indicate corresponding parts in all the views.

Figure 1 is a broken side elevation of a trap embodying my invention. Fig. 2 is a longitudinal section of the same on the line 2—2 of Fig. 3. Fig. 3 is a broken plan view of the trap, and Fig. 4 is a cross section on the line 4—4 of Fig. 1.

The trap comprises an elongated box-like structure, the middle portion 10 of which is higher than the end portions, and this middle or body portion of the trap has inclined upper end portions 11 which are provided with outwardly swinging doors 12, these being raised when the animals caught in the trap are to be removed, as hereinafter described, and the doors swing downward over the studs 13, or other suitable catches on the extended end sections 14 of the trap. It will be observed that these sections 14 are similar, so that the trap is practically a double one and has provision for holding animals at each end. This arrangement also makes the trap easy to transport, as the end sections 14 may be pushed endwise into the body portion of the trap.

The doors 12 are held down by cross rods 12ª which are removable and which project through lugs 13ª on the doors.

The trap has a removable top portion 15 which is provided with depending sides 16 adapted to overlap the sides of the middle portion 10 of the trap, and these depending sides are held within keepers 17 which are secured to the sides of the trap and which thus hold the top 15 in place. The top 15 has also at the ends side lugs 18, which overlap the sides of the trap body and serve to strengthen and stiffen the top. The object of having the top removable is for convenience in making and also enables the interior of the trap to be easily reached by simply lifting off the top.

The top 15 has parallel side flanges 19 which increase in height as they approach the central portion of the top, and a way is thus formed into which an animal is induced to enter by the arrangement of bait which will be hereinafter described. The top has between the flanges 19, tilting platforms 20, which are fulcrumed on cross rods 21, these rods being placed near the inner ends of the platforms so that the platforms lie normally in an inclined position, as shown in Fig. 2, with their inner ends the higher, so that an animal may walk easily up the said platforms, but when an animal reaches the upper portion of one of these platforms the platform tilts and projects him into the trap, as will appear presently.

The top 15 has near the center and on opposite sides flanges 22 which project above the flanges 19, and the middle portion of the trap and top are open opposite these flanges 22 and in the opening are trap doors 23, these being hinged at the sides; and the doors are fulcrumed, as shown at 24, and have behind their fulcrums weights 25 which swing the doors into a horizontal position, as clearly illustrated in Fig. 4.

The trap is provided with a bent bait rod 26 which is preferably of an inverted U-shape and is held in keepers 27 on the inner sides of the flanges 22, and the bait rod is formed preferably into a coil 28 at the top, in which coil the bait may be fastened, as shown in Fig. 1. The animal which endeavors to reach the bait on the bait rod, travels up one of the tilting platforms 20, the approach to the platform being facilitated by the inclined end of the trap, and when he passes the fulcrum or pivot of the platform and reaches for the bait the platform tilts and precipitates him upon the trap doors 23, which swing downward under the weight of the animal, thus depositing him in the trap, after which the doors swing into a horizontal position so as to prevent his escape.

In the ends of the middle portion of the trap are hung gates 29, these being pivoted at their upper ends, as shown at 30, and provided at their lower ends and opposite sides with lugs 31 which rest on the trap bottom and hold the edges of the gates slightly elevated, so that an animal will attempt to pass beneath them, and the free edges of the gates are serrated, as shown at 32, to prevent the animal from attempting to raise them after he has once passed them.

When the animal finds himself within the trap 10 he seeks to make his escape, and seeing the opening beneath one of the gates 29 he passes beneath the gate, which swings upward, as shown by dotted lines in Fig. 2, thus permitting him to pass; and he goes into one of the extension ends 14, the gate which has been lifted dropping behind him and preventing his return to the middle portion of the trap. Each end section 14 of the trap is provided, at its outer end, with an upwardly swinging door 33, pivoted at the top, as shown at 34, and held normally closed by a removable cross rod 35 which projects through the side walls of the extension end and rests against the outer portion of the door.

If desired, the captured animals may be removed through the outer ends of the sections 14, but they may be forced outward through the trap top by raising one of the doors 12, and to facilitate the removing of the animals and to cause them to be expelled forcibly, a piston 36 may be arranged within the end sections, as shown at the right hand in Fig. 2, the piston having a rod 37 which extends outward through the door 33 and terminates in a handle 38.

When the piston 36 is used, the door 12 is raised and the piston pushed inward so that the animal or animals in front of it must necessarily pass up the gate 29 and out through the door 12, where a bag or other receptacle may be arranged to receive them. To cause the animals to more readily enter the trap, the end portions may, if desired, be buried or covered.

Having thus described my invention, I claim as new and desire to secure by Letters Patent—

1. The combination of the end sections with the body of the trap, having doors arranged on its upper side contiguous to said sections, and the pivoted gates arranged in a normally inclined position beneath the said doors, their free ends resting on the floor at the inner end of said sections, as shown and described, whereby provision is made for removal of animals from the trap, as specified.

2. The combination with the body of the trap, having doors arranged on its upper side contiguous to the ends, and gates arranged beneath said doors and inclined downward toward the ends, of the tubular end sections of the trap, and slidable pistons arranged in said sections for forcibly ejecting animals up the inclined gates and through the doors, as specified.

3. A trap, comprising a box-like body portion having end extensions, swinging gates pivoted in the body portion near the inner ends of the end extensions or sections, trap doors in the top of the body portions, tilting platforms mounted on the top of the box and adapted to deliver upon the trap doors, and a bait rod arranged to sustain bait near the platforms, substantially as described.

4. The combination, with the box-like trap, of the removable top, the trap doors hung in the top and delivering into the trap, the side flanges on the top forming the way, the tilting platforms in the way, and a removable bait rod extending across the top between the platforms, substantially as described.

5. The combination, with the trap body having a door near the end, of the end section opening from the body near the door, an inclined gate pivoted in the body and extending toward the end section, and a slidable plunger or piston in the end section, substantially as described.

JOHN ROSS.

Witnesses:
LORENZO A. BARNABY,
GEO. MITCHELL.